(12) United States Patent
Tamiya et al.

(10) Patent No.: US 11,680,832 B2
(45) Date of Patent: Jun. 20, 2023

(54) DETECTION DEVICE

(71) Applicant: NTT DOCOMO, INC., Chiyoda-ku (JP)

(72) Inventors: Yuji Tamiya, Chiyoda-ku (JP); Hironori Ishikawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 127 days.

(21) Appl. No.: 17/267,692

(22) PCT Filed: Jun. 10, 2019

(86) PCT No.: PCT/JP2019/022978
§ 371 (c)(1),
(2) Date: Feb. 10, 2021

(87) PCT Pub. No.: WO2020/039701
PCT Pub. Date: Feb. 27, 2020

(65) Prior Publication Data
US 2021/0325214 A1 Oct. 21, 2021

(30) Foreign Application Priority Data
Aug. 22, 2018 (JP) .............................. JP2018-155261

(51) Int. Cl.
*G01D 21/02* (2006.01)
*G01D 15/12* (2006.01)
*G01D 15/14* (2006.01)

(52) U.S. Cl.
CPC ............. *G01D 21/02* (2013.01); *G01D 15/12* (2013.01); *G01D 15/14* (2013.01)

(58) Field of Classification Search
CPC ...... G01D 21/02; G01D 18/00; G01D 18/002; G01D 18/004; G01D 18/006;
(Continued)

(56) References Cited

U.S. PATENT DOCUMENTS

| 7,696,866 B2 * | 4/2010 | Horvitz ................. G06Q 50/06 340/3.7 |
| 8,090,552 B2 * | 1/2012 | Henry ................... G05B 11/32 702/127 |

(Continued)

FOREIGN PATENT DOCUMENTS

JP 2015-88906 A 5/2015

OTHER PUBLICATIONS

International Search Report dated Aug. 6, 2019 in PCT/JP2019/022978 filed Jun. 10, 2019.
(Continued)

*Primary Examiner* — Daniel R Miller
*Assistant Examiner* — Eric Sebastian Von Wald
(74) *Attorney, Agent, or Firm* — Oblon, McClelland, Maier & Neustadt, L.L.P.

(57) ABSTRACT

A terminal acquires measurement values from a plurality of sensors that sense a measurement target with measurement levels set therein and controls the sensors. The terminal includes: an acquisition unit configured to acquire the measurement values from the sensors; a measurement value determination unit configured to determine whether a first measurement value acquired from a first sensor among the sensors exceeds a predetermined threshold; a validity determination unit configured to determine validity of the first measurement value on the basis of measurement values acquired from other sensors when it is determined that the (Continued)

first measurement value exceeds the predetermined threshold; a measurement level determination unit configured to determine that the measurement level of the first sensor is to be raised when it is determined that the first measurement value is valid; and an instruction unit configured to transmit instruction information for changing the measurement level of the first sensor.

11 Claims, 10 Drawing Sheets

(58) Field of Classification Search
CPC ...... G01D 18/008; G01D 15/12; G01D 15/14; G01D 5/24461; G01D 5/24466; G01D 5/24471; G01D 5/24485; G06F 11/00; G06F 11/006; G06F 11/2289; G06F 11/008; G06F 11/07; G06F 9/5066; G06F 11/08; G06F 11/14; G06F 11/16; G06F 11/30; G06F 30/20; G06F 16/24568; G06F 17/18; G01P 21/00; H04N 7/181; H04L 1/203; G06N 5/04; G01N 27/4163; G06K 9/00496; G06K 9/00536; G06K 9/6288; G08B 19/00; G05B 23/024; G05B 23/0297; G05B 2219/34477; G05B 2219/37325; G05B 2219/40412; G05B 23/0221; G06V 30/1918; G06V 30/2552

See application file for complete search history.

(56) References Cited

U.S. PATENT DOCUMENTS

| | | | | |
|---|---|---|---|---|
| 9,221,396 | B1* | 12/2015 | Zhu | G01S 13/865 |
| 9,746,492 | B2* | 8/2017 | Rauh | G01N 29/04 |
| 10,468,062 | B1* | 11/2019 | Levinson | G01S 17/89 |
| 2005/0210337 | A1* | 9/2005 | Chester | G05B 23/0254 |
| | | | | 714/47.2 |
| 2006/0224357 | A1* | 10/2006 | Taware | G07C 5/085 |
| | | | | 702/179 |
| 2014/0107493 | A1* | 4/2014 | Yuen | A61B 5/7455 |
| | | | | 600/479 |
| 2017/0184416 | A1* | 6/2017 | Kohlenberg | G01D 3/08 |

OTHER PUBLICATIONS

International Preliminary Report on Patentability and Written Opinion dated Mar. 4, 2021 in PCT/JP2019/022978 (English Translation only), 6 pages.

* cited by examiner

Fig.4

| MEASUREMENT LEVEL | ACCURACY | FREQUENCY |
|---|---|---|
| 4 | HIGH | MEDIUM |
| 3 | LOW | HIGH |
| 2 | LOW | MEDIUM |
| 1 | LOW | LOW |

Fig.6

| MEASUREMENT LEVEL | NUMBER OF SENSORS |
|---|---|
| 4 | 0 |
| 3 | 1 |
| 2 | 2 |
| 1 | 1 |

Fig.7
(a)
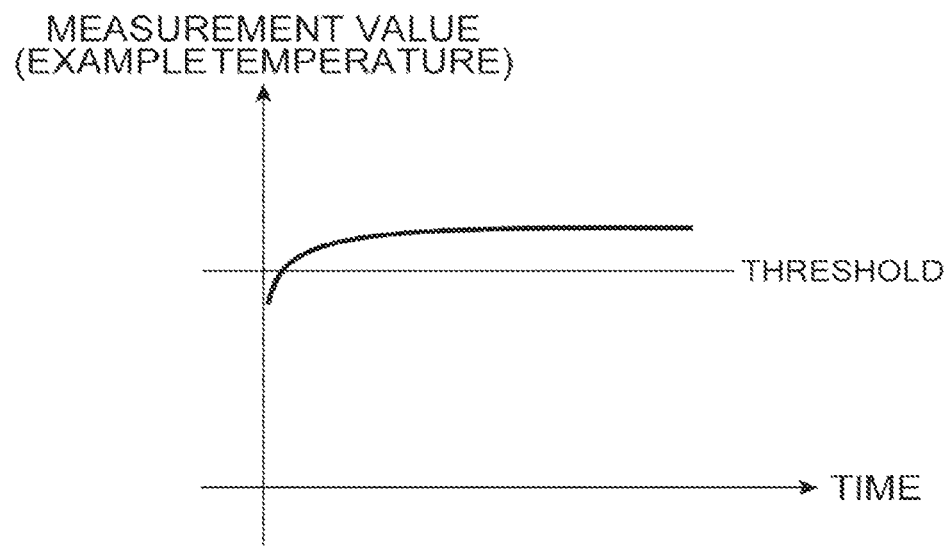
EXAMPLE OF CHANGE IN MEASUREMENT VALUE OF HIGH-ACCURACY SENSOR
(b)
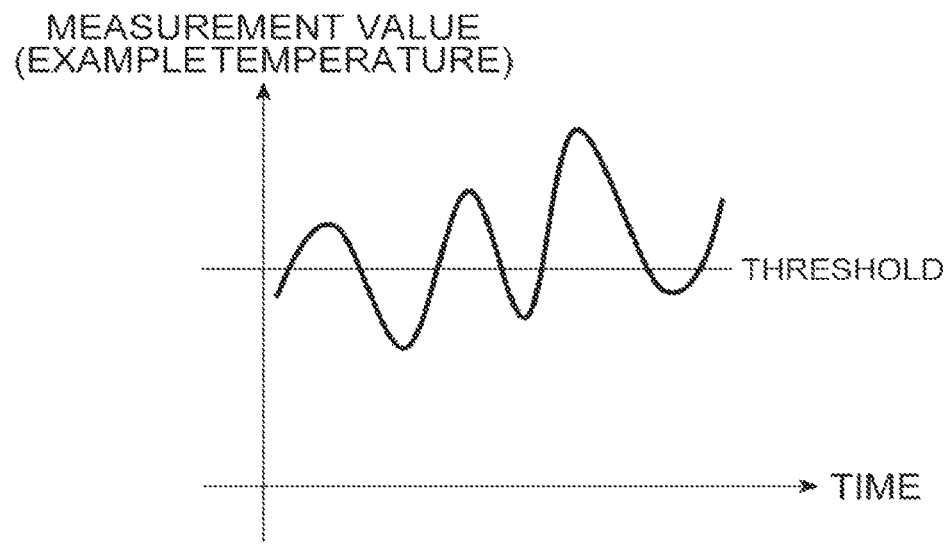
EXAMPLE OF CHANGE IN MEASUREMENT VALUE OF LOW-ACCURACY SENSOR Fig.8 (a)
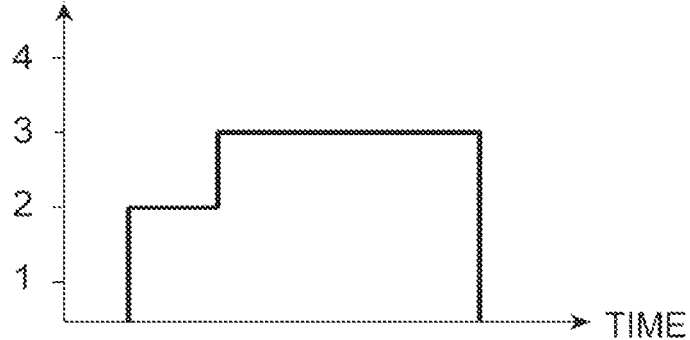
(b)
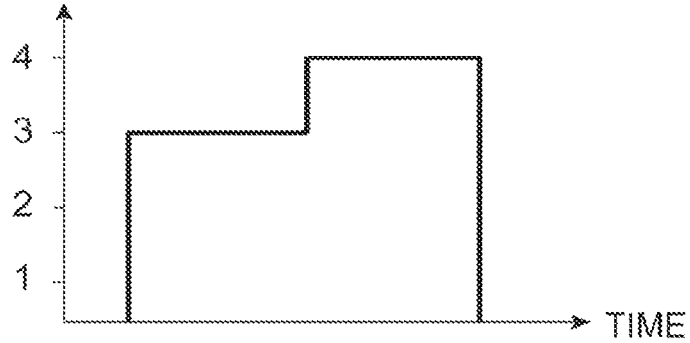
(c)
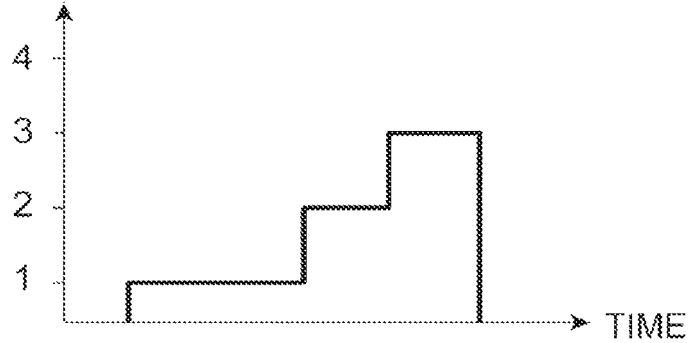

DETECTION DEVICE

TECHNICAL FIELD

The present invention relates to a detection apparatus.

BACKGROUND ART

A technology of monitoring behaviors of persons and environmental conditions using detection data acquired by sensors is known. A sensor is configured as a Bluetooth Low Energy (BLE) device (Bluetooth is a registered trademark), for example. In such a sensor, suppression of power consumption is required. Particularly, since a plurality of sensors are provided in a remote measurement target, when the sensors are driven by a battery, further suppression of power consumption is required. For example, a technology in which a controller receives a present state of a sensor and determines an operation mode of the sensor on the basis of an estimated remaining driving time of the sensor is known (for example, see Patent Literature 1).

CITATION LIST

Patent Literature

Patent Literature 1: Japanese Unexamined Patent Publication No. 2015-88906

SUMMARY OF INVENTION

Technical Problem

In the technology disclosed in Patent Literature 1, it is possible to control the power consumption according to a remaining driving time of the sensor. However, since the operation mode is determined without regard to the state of a measurement value obtained by sensing the measurement target, there is a possibility of the measurement target not being sensed according to the degree of detail needed. In sensing of a measurement target, detailed measurement is performed and suppression of power consumption is required.

Therefore, the present invention has been made in view of the above-described problems, and an object thereof is to provide a detection apparatus capable of sensing a measurement target according to the degree of detail needed and suppressing power consumption.

Solution to Problem

In order to solve these problems, a detection apparatus according to an embodiment of the present invention is a detection apparatus configured to acquire measurement values from a plurality of sensors that sense a predetermined measurement target with measurement levels set therein and controls the sensors, the measurement level being a degree of sensing detail of the measurement target, the detection apparatus including: an acquisition unit configured to acquire the measurement values from each of the plurality of sensors; a measurement value determination unit configured to determine whether a first measurement value acquired from a first sensor among the plurality of sensors exceeds a predetermined threshold; a validity determination unit configured to determine validity of the first measurement value on the basis of measurement values acquired from one or more sensors other than the first sensor among the plurality of sensors when the measurement value determination unit determines that the first measurement value exceeds the predetermined threshold; a measurement level determination unit configured to determine that the measurement level of the first sensor is to be raised when the validity determination unit determines that the first measurement value is valid; and an instruction unit configured to transmit instruction information for changing the measurement level of the first sensor on the basis of a determination result obtained by the measurement level determination unit.

In the above-described embodiment, a measurement value indicating that a measurement target is to be observed in more detail is set in advance as a predetermined threshold, and the validity of a first measurement value is determined on the basis of a measurement value of a sensor other than a first sensor when a first measurement value from the first sensor exceeds the predetermined threshold. Therefore, it is appropriately determined whether sensing is to be performed by raising a measurement level. Since the power consumption increases as the measurement level of a sensor increases, the measurement level of the first sensor is raised only when it is determined that sensing is to be performed by raising the measurement level. Therefore, the measurement level is not raised when it is not necessary to perform sensing in detail, and power consumption can be suppressed.

Advantageous Effects of Invention

It is possible to perform sensing according to the degree of detail needed and suppress power consumption.

BRIEF DESCRIPTION OF DRAWINGS

FIG. 4 is a diagram illustrating a definition of a measurement level.

FIG. 6 is a diagram illustrating an example of default information.

FIGS. 7(a) and 7(b) are diagrams illustrating examples of change in a measurement value of a sensor.

FIGS. 8(a), 8(b), and 8(c) are diagrams illustrating changes in measurement levels of sensors for estimating power consumption of a sensor in a predetermined period.

DESCRIPTION OF EMBODIMENTS

Hereinafter, an embodiment of a detection system according to the present invention will be described in detail with reference to the accompanying drawings. If possible, the same elements will be referred to by the same reference signs and description thereof will not be repeated.

Figure 1:
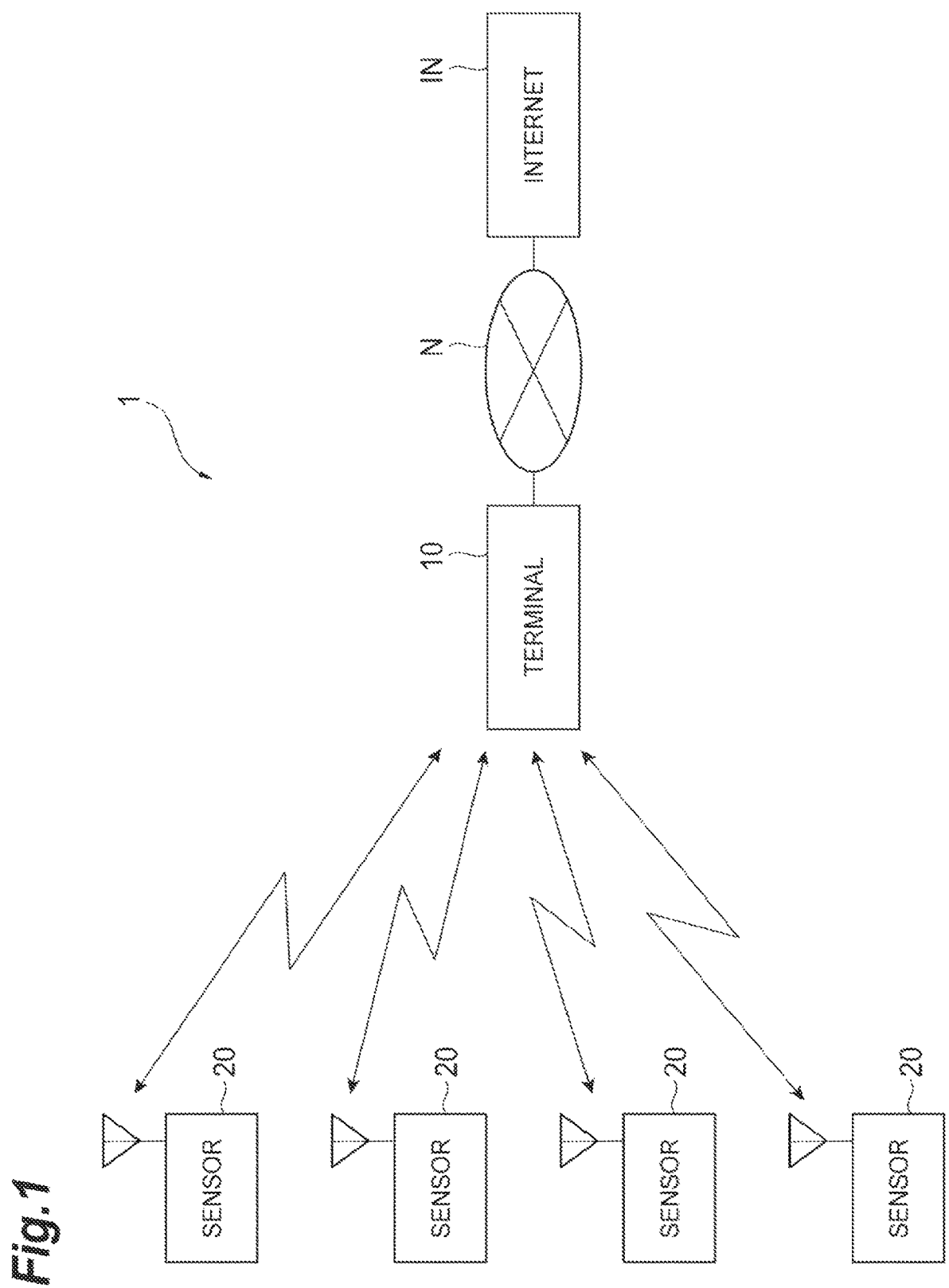
FIG. 1 is a diagram illustrating an apparatus configuration of a detection system according to the present embodiment.

FIG. 1 is a diagram illustrating an apparatus configuration of a detection system 1 according to the present embodiment. As illustrated in FIG. 1, the detection system 1 includes a terminal 10 (a detection apparatus) and a plurality of sensors 20. The terminal 10 is an apparatus that acquires measurement values from the plurality of sensors 20 and controls the sensors 20. The sensors 20 are apparatuses that sense predetermined measurement targets according to measurement levels set therein. The sensors 20 of the present embodiment are sensor devices such as, for example, temperature sensors, sunshine sensors, and motion sensors, and are configured as BLE devices, for example. Moreover, the sensors 20 are driven by batteries.

In the detection system 1 of the present embodiment, a plurality of sensors 20 are provided in a detection target, and the terminal 10 acquires detection data including measurement values related to the condition of the measurement target from the plurality of sensors 20. The terminal 10 acquires the detection data from the sensors 20 by Bluetooth (registered trademark) communication. Moreover, the terminal 10 controls the operation of the sensors 20 by transmitting instruction information to be described later to the sensors 20. Although four sensors 20 are illustrated in FIG. 1, the number of sensors is not limited.

The detection system 1 of the present embodiment may detect the temperature of a paddy field as a detection target, for example. In this case, the sensors 20 which are temperature sensors are provided in a plurality of locations around the paddy field. The terminal 10 acquires detection data including temperature information detected by the sensors 20.

The detection system 1 of the present embodiment may detect a sunshine condition of a specific location as a detection target, for example. In this case, the sensors 20 which are luminance sensors are provided at a plurality of locations around the specific location. The terminal 10 acquires detection data including luminance information detected by the sensors 20.

The detection system 1 of the present embodiment may detect the number of persons staying in a specific location as a detection target, for example. In this case, the sensors 20 which are motion sensors are provided at a plurality of locations around the specific location. The terminal 10 acquires detection data including location information of a person detected by the sensors 20.

The terminal 10 is a mobile terminal apparatus and may be a portable personal computer, and may be a portable terminal such as a high-functionality portable telephone (a smartphone) or a portable telephone, for example. In the present embodiment, the terminal 10 is configured to be able to receive Bluetooth signals from the sensors 20.

Figure 2:
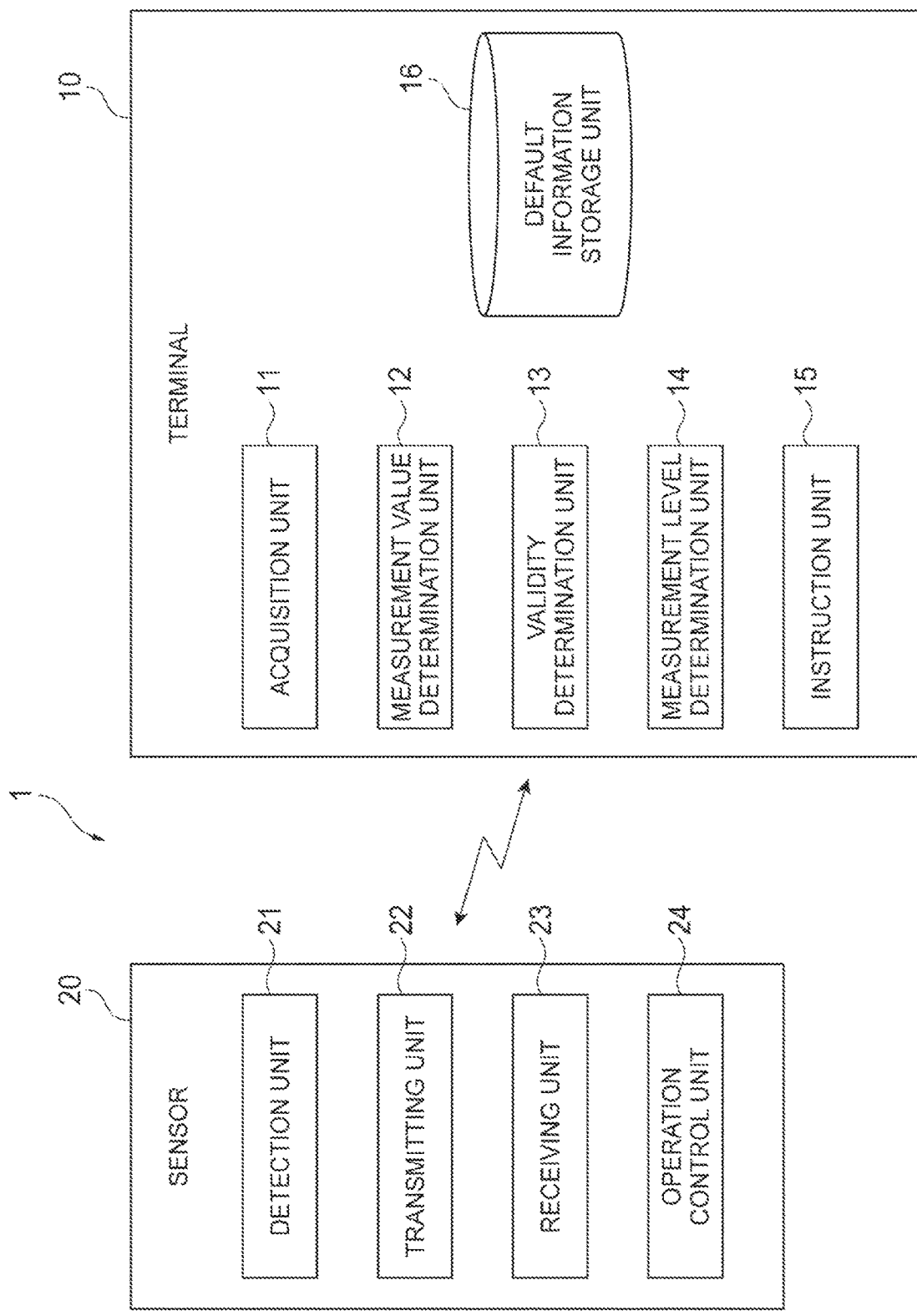
FIG. 2 is a block diagram illustrating a functional configuration of a terminal and a sensor.

FIG. 2 is a block diagram illustrating a functional configuration of the terminal 10 and the sensor 20. As illustrated in FIG. 2, the terminal 10 includes an acquisition unit 11, a measurement value determination unit 12, a validity determination unit 13, a measurement level determination unit 14, and an instruction unit 15. Moreover, the terminal 10 may include a default information storage unit 16.

The sensors 20 include detection units 21, transmitting units 22, receiving units 23, and operation control units 24. Here, prior to description of functional units of the terminal 10, the functional units of the sensors 20 will be described.

The detection units 21 acquire measurement values related to a measurement target. The measurement values differ depending on sensor devices that constitute the sensors 20. When the sensors 20 are temperature sensors, for example, the detection units 21 acquire temperature information as the measurement values. When the sensors 20 are luminance sensors, for example, the detection units 21 acquire luminance information as the measurement values.

The transmitting units 22 transmit detection data including the measurement values acquired by the detection units 21 to the terminal 10. The receiving units 23 receive instruction information related to measurement levels of the sensors 20, transmitted from the terminal 10. The operation control units 24 control operation of the sensors 20 so that the sensors 20 operate in measurement levels based on the instruction information.

The block diagram illustrated in FIG. 2 illustrates functional blocks. These functional blocks (configuration units) are realized by an arbitrary combination of hardware and/or software. Moreover, a realization method for realizing the respective functional blocks is not particularly limited. That is, the respective functional blocks may be realized by one apparatus which is physically or logically coupled or may be realized by a plurality of apparatuses which are physically or logically separated and which are directly and/or indirectly (for example, by cables and/or wirelessly) connected. The functional blocks may be realized by combining software with one apparatus or a plurality of apparatuses.

Examples of functions include determining, deciding, judging, calculating, computing, processing, deriving, investigating, searching, ascertaining, receiving, transmitting, outputting, accessing, resolving, selecting, choosing, establishing, comparing, assuming, expecting, considering, broadcasting, forwarding, configuring, reconfiguring, allocating (mapping), assigning, and the like, but there is no limitation thereto. For example, a functional block (configuration unit) for performing transmission may be referred to as a transmitting unit or a transmitter. As described above, a realization method thereof is not particularly limited.

Figure 3:
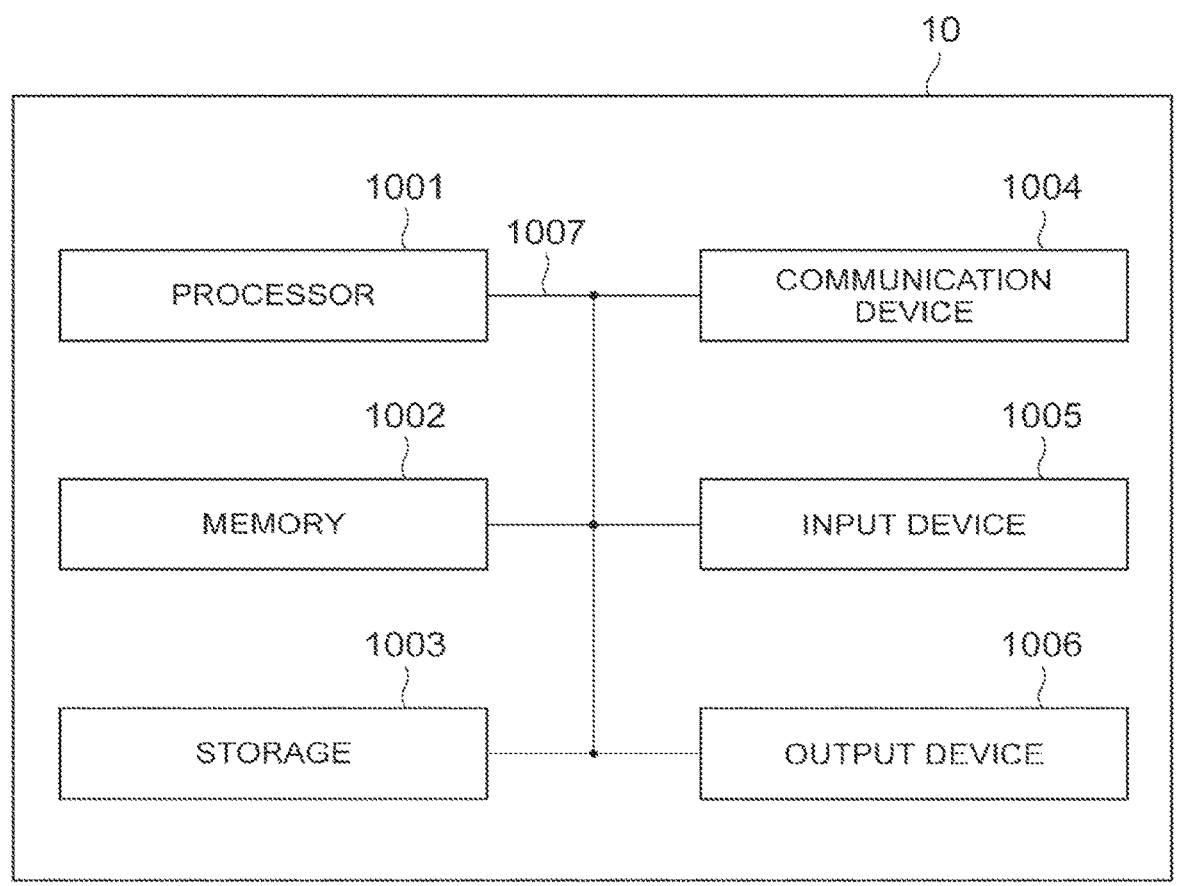
FIG. 3 is a hardware block diagram of a terminal.

For example, the terminal 10 according to an embodiment of the present invention may function as a computer. FIG. 3 is a diagram illustrating an example of a hardware configuration of the terminal 10 according to the present embodiment. The terminal 10 may be physically configured as a computer apparatus which includes a processor 1001, a memory 1002, a storage 1003, a communication device 1004, an input device 1005, an output device 1006, a bus 1007, and the like.

In the following description, the word "apparatus" may be replaced with "circuit," "device," "unit," or the like. The hardware configuration of the terminal 10 may include one or a plurality of apparatuses illustrated in the drawings and may not include some apparatuses.

The respective functions of the terminal 10 are realized when predetermined software (program) is read onto hardware such as the processor 1001, the memory 1002, and the like, the processor 1001 performs an operation, and the communication by the communication device 1004 and the data read and/or written in the memory 1002 and the storage 1003 are controlled.

The processor 1001 operates an operating system to control the entire computer, for example. The processor 1001 may be configured as a central processing unit (CPU) that includes an interface to a peripheral apparatus, a control apparatus, an operation apparatus, a register, and the like. For example, the respective functional units 11 to 15 and the like illustrated in FIG. 1 may be realized by the processor 1001.

The processor 1001 reads a program (program codes), a software module, or data from the storage 1003 and/or the communication device 1004 into the memory 1002 and executes various processes according to the program and the like. A program for causing a computer to execute at least a portion of the operations described in the embodiment is used as the program. For example, the respective functional units 11 to 15 of the terminal 10 may be realized by a control program which is stored in the memory 1002 and operated by the processor 1001. Although it has been described that the above-described processes are executed by one processor 1001, the processes may be executed by two or more processors 1001 simultaneously or sequentially. One or more chips may be mounted in the processor 1001. The program may be transmitted from a network via a telecommunication circuit.

The memory 1002 is a computer-readable recording medium and may be configured as at least one of a read only memory (ROM), an erasable programmable ROM (EPROM), an electrically erasable programmable ROM (EEPROM), a random access memory (RAM), and the like, for example. The memory 1002 may be referred to as a register, a cache, a main memory (main storage device), and the like. The memory 1002 can store a program (program codes), a software module, and the like that can be executed to perform a detection method according to an embodiment of the present invention.

The storage 1003 is a computer-readable recording medium and may be configured as at least one of an optical disc such as a compact disc (CD)-ROM, a hard disk drive, a flexible disk, an optomagnetic disc (for example, a compact disc, a digital versatile disc, or a Blu-ray (registered trademark) disc), a smartcard, a flash memory (for example, a card, a stick, or a key drive), a floppy (registered trademark) disk, a magnetic strip, and the like, for example. The storage 1003 may be referred to as an auxiliary storage apparatus. The above-descried storage medium may be a database and a server, and any other appropriate medium that include the memory 1002 and/or the storage 1003.

The communication device 1004 is hardware (a transmission and reception apparatus) for performing communication between computers via cables and/or a wireless network and is also referred to as a network device, a network controller, a network card, a communication module, and the like, for example.

The input device 1005 is an input device (for example, a keyboard, a mouse, a microphone, a switch, a button, a sensor, and the like) that receives the input from the outside. The output device 1006 is an output device (for example, a display, a speaker, an LED lamp, or the like) that outputs information to the outside. The input device 1005 and the output device 1006 may have an integrated configuration (for example, a touch panel).

The respective apparatuses such as the processor 1001 and the memory 1002 are connected by the bus 1007 for communicating information. The bus 1007 may be configured as a single bus and may be configured as different buses for respective apparatuses.

The terminal 10 may be configured to include hardware such as a microprocessor, a digital signal processor (DSP), an application specific integrated circuit (ASIC), a programmable logic device (PLD), a field programmable gate array (FPGA), and the like, and some or all of the respective functional blocks may be realized by the hardware. For example, the processor 1001 may be implemented by at least one of these items of hardware.

Next, the measurement level set in each sensor 20 will be described with reference to FIG. 4. FIG. 4 is a diagram illustrating an example of a definition of a measurement level. A measurement level is the degree of sensing detail of a measurement target, and is defined at least by the sensing accuracy for a measurement target. In the present embodiment, as illustrated in FIG. 4, a measurement level is defined by the sensing accuracy for a measurement target and the sensing frequency. For example, a measurement level of "1" corresponds to the lowest degree of sensing detail, and the sensor 20 in which the measurement level of "1" is set operates with accuracy of "low" and frequency of "low." Moreover, a measurement level of "4" corresponds to the highest degree of sensing detail, and the sensor 20 in which the measurement level of "4" is set operates with accuracy of "high" and frequency of "medium."

It is assumed that the sensor 20 of the present embodiment can perform sensing while switching between a high-accuracy operation state and a low-accuracy operation state. The sensor 20 may include two sensors having high accuracy and low accuracy provided at the same position, and a high-accuracy operation state and a low-accuracy operation state may be realized by switching between the operating states. The power consumption of the sensor 20 operating with high accuracy is higher than the power consumption of the sensor 20 operating with low accuracy.

The sensor 20 of the present embodiment can set the sensing frequency to "low," "medium," or "high" by switching the operation mode. The power consumption of the sensor 20 operating with a frequency of "high" is higher than the power consumption of the sensor 20 operating with a frequency of "medium." Moreover, the power consumption of the sensor 20 operating with a frequency of "medium" is higher than the power consumption of the sensor 20 operating with a frequency of "low."

Next, an operation mode of the sensor 20 in the detection system 1 of the present embodiment will be described with reference to FIG. 5. The sensor 20 operates in any one of a periodical mode, a trigger mode, and a lead mode. A periodical mode realizes a "high" frequency operation. A trigger mode realizes a "medium" frequency operation. A lead mode realizes a "low" frequency operation.

Figure 5:
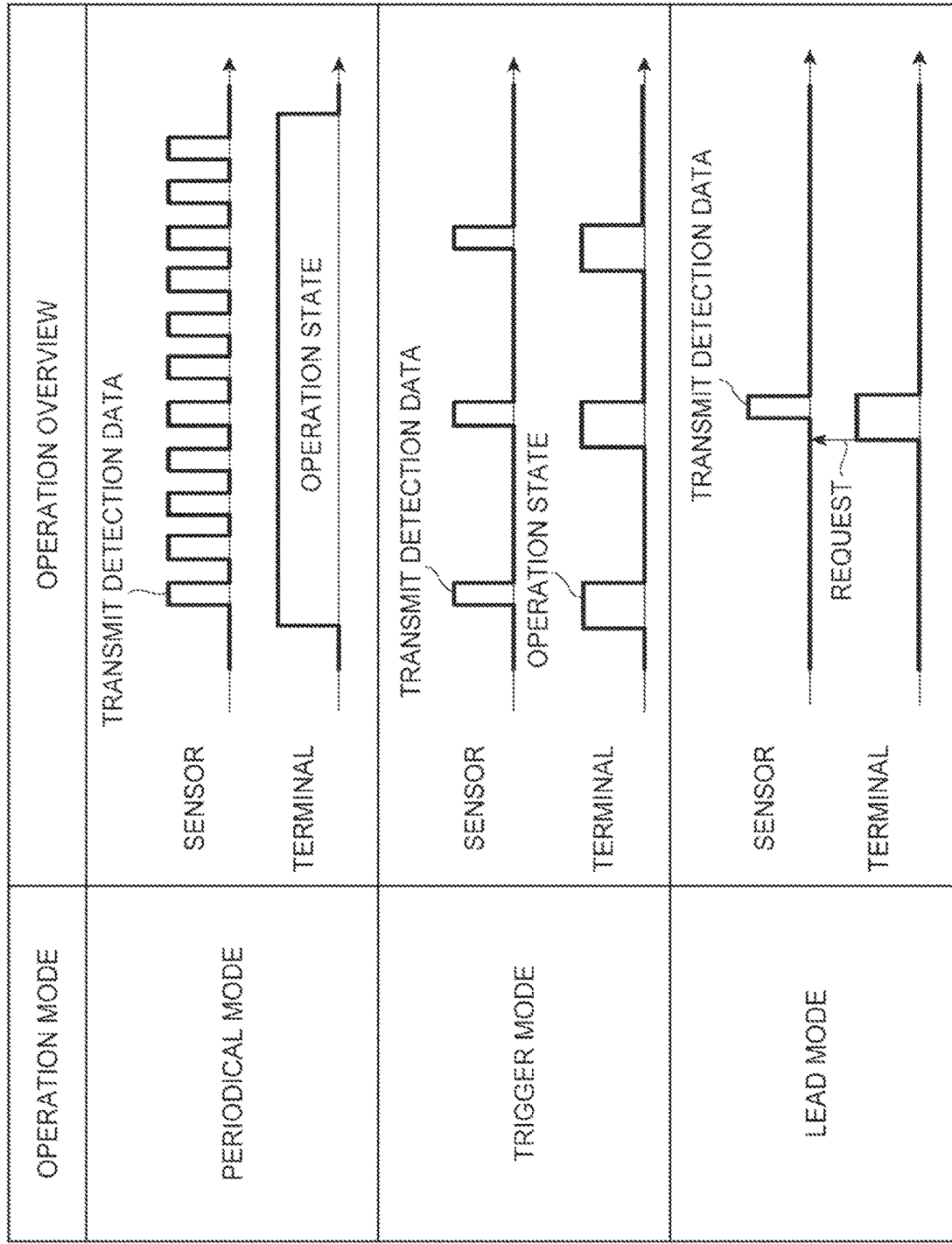
FIG. 5 is a diagram illustrating operation modes of a sensor in a detection system.

As illustrated in FIG. 5, a periodical mode is an operation method in which detection data is transmitted to the terminal 10 at a predetermined constant time interval. In the periodical mode, the sensor 20 transmits detection data at a constant time interval, and as a result, the terminal 10 maintains an operation for receiving detection data.

As illustrated in FIG. 5, a trigger mode is an operation method in which the sensor 20 transmits detection data to the terminal 10 when a predetermined change occurs in the detection value obtained by the sensor 20 or when a predetermined period has elapsed after transmission of the detection data from the sensor 20 to the terminal 10. That is, using an event determined by the sensor 20 as a trigger, the sensor 20 independently transmits detection data to the terminal 10.

As illustrated in FIG. 5, a lead mode is an operation method in which the sensor 20 transmits detection data to the terminal 10 according to a request from the terminal 10. The terminal 10 acquires surrounding environment information related to a detection target of the sensor 20 from various resources and transmits a request to the sensor 20 on the basis of the state of and the change in the acquired surrounding environment information. In the present embodiment, the terminal 10 can acquire the surrounding environment information from various resources on the Internet, for example.

Specifically, for example, when the detection target is the temperature of a paddy field, the terminal 10 acquires the temperature information of a region where the paddy field is located as the surrounding environment information. Moreover, when the detection target is the sunshine condition of a specific location, the terminal 10 acquires sunshine information of a region to which the specific location belongs as the surrounding environment information. Furthermore, when the detection target is the number of persons staying in a specific location, the terminal 10 acquires information on the number of users of portable terminals in a region to which the specific location belongs as the surrounding environment information.

The terminal 10 transmits a request for acquiring detection data to the sensor 20 when the amount of change in the surrounding environment information acquired in a time series exceeds a predetermined threshold. In the present embodiment, correlation between the amount of change in the surrounding environment information and the amount of change in the detection value obtained by the sensor 20 is determined, and a predetermined threshold related to the amount of change in the surrounding environment information is set on the basis of the magnitude of correlation. Specifically, the larger the correlation between the amount of change in the surrounding environment information and the amount of change in the detection value obtained by the sensor 20, the lower the predetermined threshold related to the amount of change in the surrounding environment information becomes.

The trigger mode and the lead mode are operation modes in which detection data is transmitted to the terminal 10 with a lower frequency than that of the periodical mode. The lead mode is an operation method in which the transmission frequency of detection data is lower than that of the trigger mode.

Referring again to FIG. 2, prior to description of the functional units 11 to 15 of the terminal 10, the default information storage unit 16 will be described. The default information storage unit 16 is a storage unit that stores default information that defines a standard number of sensors 20 for each measurement level in advance for a plurality of sensors 20 that sense a measurement target. FIG. 6 is a diagram illustrating an example of the default information stored in the default information storage unit 16. As illustrated in FIG. 6, the default information defines a standard number of sensors for each measurement level. In the example of the present embodiment, since the detection system 1 includes four sensors 20, the default information defines that, as a standard state of the detection system 1, for the four sensors 20, the number of sensors 20 operating with the measurement level of "1" is 1, the number of sensors 20 operating with the measurement level of "2" is 2, and the number of sensors 20 operating with the measurement level of "3" is 1.

The terminal 10 stores an operation state (measurement level (accuracy and frequency)) and position information (not illustrated) of each of the sensors 20 included in the detection system 1. Moreover, the terminal 10 stores information (not illustrated) indicating the distances between the sensors 20.

Referring again to FIG. 2, the functional units 11 to 15 of the terminal 10 will be described. The acquisition unit 11 acquires measurement values from each of the plurality of sensors. Specifically, since each sensor 20 transmits detection data including measurement values obtained by sensing the measurement target to the terminal 10, the acquisition unit 11 acquires the detection data transmitted from each sensor 20.

The measurement value determination unit 12 determines whether a first measurement value acquired from a first sensor among the plurality of sensors exceeds a predetermined threshold. The predetermined threshold is a boundary at which more detailed and accurate observation is required for the measurement value of the measurement target.

The predetermined threshold may be set according to the design of an administrator of the detection system 1, for example. The first sensor which is the target of determination of whether the measurement value exceeds the predetermined threshold may be set arbitrarily among the plurality of sensors 20, for example. Moreover, the measurement value determination unit 12 may extract a sensor 20 that has transmitted the measurement value exceeding the predetermined threshold as the first sensor.

The measurement value determination unit 12 further determines whether a first measurement value acquired from the first sensor is equal to or smaller than the predetermined threshold for a predetermined period or longer after the measurement value of the first sensor exceeds the predetermined threshold.

The validity determination unit 13 determines validity of the first measurement value on the basis of measurement values acquired from one or more sensors 20 other than the first sensor among the plurality of sensors 20 when the measurement value determination unit determines that the first measurement value exceeds the predetermined threshold.

FIG. 7 is a diagram schematically illustrating an example of change in a measurement value depending on the height of accuracy of the sensor 20. FIG. 7(a) is a diagram illustrating an example of change in a measurement value (temperature) of a high-accuracy sensor 20. FIG. 7(b) is a diagram illustrating an example of change in a measurement value (temperature) of a low-accuracy sensor 20. As illustrated in FIG. 7(a), since variation in a measurement value with respect to a correct temperature is relatively small in a high-accuracy sensor, it is easy to determine whether the measurement value exceeds the threshold. On the other hand, as illustrated in FIG. 7(b), since variation in a measurement value with respect to a correct temperature is relatively large in a low-accuracy sensor, determination of whether the measurement value exceeds the threshold may be difficult or inaccurate. Therefore, the determination of whether the first measurement value exceeds the predetermined threshold may take the validity of the first measurement value acquired by the high-accuracy sensor 20 into consideration.

In the present embodiment, specifically, the validity determination unit 13 determines the validity of the first measurement value on the basis of an evaluation value calculated on the basis of the measurement values acquired from the other sensors 20.

The validity determination unit 13 determines the validity of the first measurement value on the basis of the first evaluation value, for example. The first evaluation value is calculated by statistically summing the measurement values of the other sensors 20 weighted on the basis of the accuracy of the respective sensors 20. The first evaluation value may be calculated by Equation (1) below, for example.

[Math. 1]

$$\text{First evaluation value} = \sum_{m=2}^{N}(Tm*Sm)\bigg/\sum_{m=2}^{N}(Sm) \quad (1)$$

In Expression (1), N is a total number of sensors 20. Sm is the accuracy of an m-th sensor 20 among the sensors 20. The first sensor (m=1) is the first sensor. Tm is a measurement value of the m-th sensor 20 among the sensors 20. Sm is represented as follows.

$$Sm = (\text{deflection } \sigma)^2 + (\text{variation } \varepsilon)^2$$

The validity determination unit 13 determines that the first measurement value is valid when the first evaluation value exceeds a predetermined value.

As described above, since the first evaluation value calculated by statistically summing the measurement values of the other sensors 20 weighted on the basis of the accuracy of the other sensors 20 is used for determination of the validity of the first measurement value, the validity of the first measurement value is determined appropriately and the measurement target is sensed with an appropriate degree of detail.

The validity determination unit 13 may determine the validity of the first measurement value on the basis of a second evaluation value, for example. The second evaluation value is calculated by statistically summing the measurement values of the other sensors 20 weighted on the basis of at least one of the time difference between the time point at which the first measurement value exceeding the predetermined threshold was measured and the time point at which the measurement values of the other sensors 20 were measured and the distances between the first sensor and the other sensors 20. The second evaluation value may be calculated by Expression (2) below, for example.

[Math. 2]

$$\text{Second evaluation value} = \sum_{m=2}^{N}(Tm*|t1-tm|*d1m) \Big/ \sum_{m=2}^{N}(|t1-tm|*d1m) \quad (2)$$

In Expression (2), N is a total number of the other sensors 20. t1 is an acquisition time of the first measurement value. Tm is the measurement value acquired at a time point closest to t1 of the m-th sensor 20 among the other sensors 20, and tm is the time point at which the measurement value was acquired. d1m is the distance between the first sensor and the m-th sensor 20 among the other sensors 20. The validity determination unit 13 determines that the first measurement value is valid when the second evaluation value exceeds the predetermined value.

As described above, since the second evaluation value is calculated by statistically summing the measurement values of the other sensors weighted on the basis of at least one of the time difference from the time point at which the first measurement value was measured and the distance from the first sensor, the second evaluation value is a value calculated by taking a spatial correlation between sensors and a temporal correlation between measurement values into consideration. Moreover, since the second evaluation value calculated in this manner is used for determining the validity of the first measurement value, the validity of the first measurement value is determined appropriately and the measurement target is sensed with an appropriate degree of detail.

The validity determination unit 13 may determine the validity of the first measurement value on the basis of the first evaluation value when a sensor 20 operating with a predetermined degree or more of accuracy is present within a predetermined distance from the first sensor. The validity determination unit 13 may determine the validity of the first measurement value on the basis of the second evaluation value when a sensor 20 operating with a predetermined degree or more of accuracy is not present within a predetermined distance from the first sensor. For example, the validity determination unit 13 may determine the validity of the first measurement value on the basis of the first evaluation value or the second evaluation value depending on the presence of a sensor 20 operating with an accuracy of "high."

As described above, since the first evaluation value is used for determination of the validity when a sensor 20 operating with a high degree of accuracy is present within a predetermined distance from the first sensor, the validity of the first measurement value is determined by taking the accuracy of the other sensors present around the first sensor into consideration. Moreover, since the second evaluation value is used for determination of the validity when a sensor 20 operating with a high degree of accuracy is not present within a predetermined distance from the first sensor, the validity of the first measurement value is determined by taking a spatial correlation between sensors and a temporal correlation between measurement values into consideration. Therefore, the validity of the first measurement value is determined appropriately depending on the presence of a sensor operating with high accuracy, positioned within a predetermined distance from the first sensor.

The validity determination unit 13 may acquire the measurement values of the first sensor measured a plurality of times in any one of a predetermined period before the acquisition time of the first measurement value, a predetermined period after the acquisition time of the first measurement value, and a predetermined period including the acquisition time of the first measurement value and may determine that the first measurement value is valid when the percentage of the measurement value exceeding the predetermined threshold among the plurality of measurement values is equal to or larger than a predetermined percentage.

The measurement level determination unit 14 determines that the measurement level of the first sensor is to be raised when the validity determination unit 13 determines that the first measurement value is valid. Specifically, the measurement level determination unit 14 may change the measurement level of the first sensor to a level corresponding to a high degree of detail of observation of a measurement target. In the present embodiment, the measurement level determination unit 14 may determine that the measurement level of the first sensor is to be changed to "4." Moreover, the measurement level determination unit 14 may determine that the measurement level of the first sensor is to be raised by one step from the present level.

The measurement level determination unit 14 may determine that the measurement level of at least one or more sensors among sensors provided outside the range of a predetermined distance from the first sensor is to be raised when the validity determination unit 13 determines that the first measurement value is valid. Specifically, for example, the measurement level determination unit 14 may determine the measurement levels of all sensors provided outside the range of a predetermined distance from the first sensor are to be raised by one step from the present level.

In this way, since the measurement level of a sensor present outside the range of a predetermined distance from the first sensor is raised when it is determined that the first measurement value is valid, detailed sensing is performed when it is necessary to observe the measurement target in more detail.

The instruction unit 15 transmits instruction information for changing the measurement level of the first sensor to the first sensor on the basis of the determination result obtained by the measurement level determination unit 14. Moreover, when it is determined that the measurement levels of the sensors other than the first sensor are to be changed, the instruction unit 15 may transmit instruction information for changing the measurement level to the other sensors.

Next, a process for lowering the measurement level of the sensor 20 of which the measurement level is determined to be raised on the basis of a fact that the first measurement value of the first sensor among the plurality of sensors 20 exceeds a predetermined threshold will be described.

When the measurement value determination unit 12 determines that the first measurement value of the first sensor is equal to or smaller than a predetermined threshold for a predetermined period or longer, the measurement level determination unit 14 determines that the measurement levels of at least one or more sensors 20 among the sensors 20 of which the measurement levels are determined to be raised are to be lowered on the basis of a fact that the first measurement value exceeds the predetermined threshold.

Specifically, when the measurement level of the first sensor is raised to the highest level (for example, the measurement level of "4") or is raised by one step from an initial state (the state defined in the default information), the measurement level determination unit 14 may determine that the measurement level of the first sensor is to be lowered by one step or is to be restored to an original initial state, for example.

When the measurement level of another sensor other than the first sensor among the plurality of sensors 20 is raised, the measurement level determination unit 14 may determine that the measurement level of the other sensor is to be lowered by one step or is to be restored to an original initial state.

The terminal 10 of the present embodiment can refer to the default information that defines a standard number of sensors for each measurement level in advance for the plurality of sensors 20 that senses a measurement target. Specifically, since the default information storage unit 16 stores the default information, the terminal 10 can refer to the default information stored in the default information storage unit 16. The measurement level determination unit 14 may determine that the measurement level of a sensor of which the measurement level is determined to be raised is to be lowered on the basis of a fact that the first measurement value exceeds a predetermined threshold corresponding to the default information.

As described above, since the default information is set as an observation state during a normal state and the measurement level of the sensor 20 of which the measurement level is determined to be raised is to be lowered on the basis of a fact that the first measurement value exceeds the predetermined threshold corresponding to the default information, it is possible to restore the measurement level to an appropriate observation state during a normal state and to suppress power consumption.

The measurement level determination unit 14 may determine that the measurement levels of the sensors 20 are to be lowered on the basis of the power consumption of the sensors 20 when it is determined that the first measurement value of the first sensor is equal to or smaller than the predetermined threshold for a predetermined period or longer. Specifically, the measurement level determination unit 14 may estimate the power consumption of the respective sensors 20 on the basis of an operation time at each measurement level in a predetermined period before it was determined by the measurement value determination unit 12 that the first measurement value is equal to or smaller than the predetermined threshold for a predetermined period or longer and may determine the measurement level of each sensor 20 so that the larger the estimated power consumption of the sensor 20, the lower the measurement level with which the sensor operates.

FIGS. 8(*a*) to 8(*c*) are diagrams illustrating an example of change in measurement level in a predetermined period of sensors (sensor 1 to sensor 3) among the plurality of sensors 20. As described above, the higher the measurement level, the larger the power consumption of the sensor 20. Therefore, the estimated power consumption of the sensor 1 among the sensors 1 to 3 illustrated in FIG. 8 is larger than the power consumption of the sensor 3. Moreover, the estimated power consumption of the sensor 2 is larger than the power consumption of the sensor 1.

In such a case, the measurement level determination unit 14 determines that the measurement level of the sensor 2 among the sensors 1 to 3 is to be changed to the lowest level. Moreover, the measurement level determination unit 14 determines that the measurement level of the sensor 1 is to be changed to a measurement level the next lowest to the sensor 2. Furthermore, the measurement level determination unit 14 determines that the measurement level of the sensor 3 is to be changed to a measurement level the next lowest to the sensor 1.

In this manner, since the power consumption of each sensor 20 in adjacent predetermined periods is estimated, and the measurement level is set such that the larger the power consumption of a sensor, the lower becomes the measurement level on the basis of the estimated power consumption, the power consumption of the respective sensors 20 is equalized.

Figure 9:
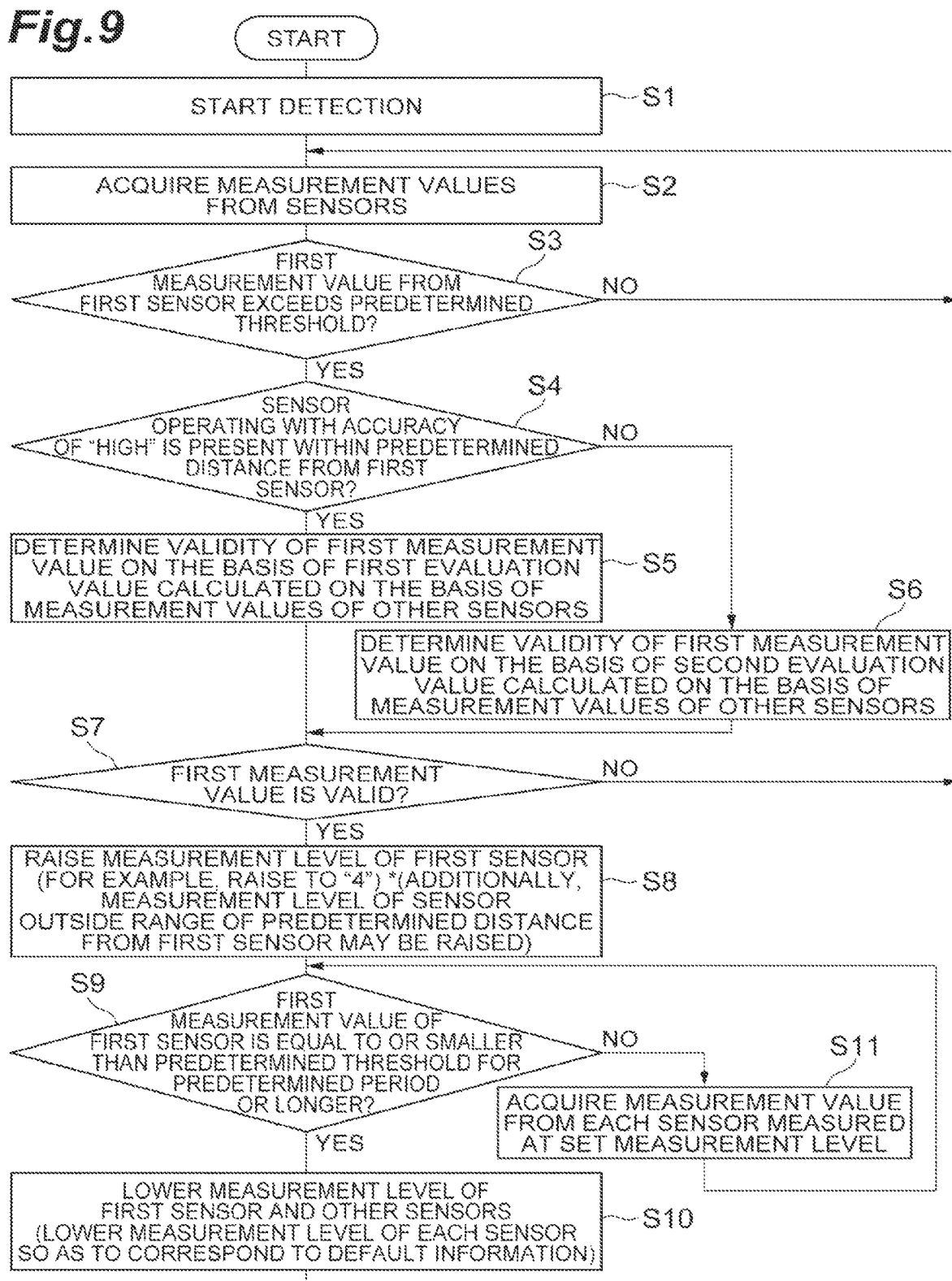
FIG. 9 is a flowchart illustrating the details of processing of a detection method according to the present embodiment.

Next, a detection method in the detection system 1 will be described with reference to FIG. 9. FIG. 9 is a flowchart illustrating the details of processing of the detection method according to the present embodiment.

In step S1, the detection system 1 starts detecting a measurement target. The detection system 1 may detect a measurement target depending on the number of sensors for each measurement level defined in the default information, for example.

In step S2, the acquisition unit 11 acquires measurement values from each sensor 20. In the subsequent step S3, the measurement value determination unit 12 determines whether the first measurement value acquired from the first sensor among the plurality of sensors 20 exceeds a predetermined threshold. When it is determined that the first measurement value exceeds the predetermined threshold, the flow proceeds to step S4. On the other hand, when it is determined that the first measurement value does not exceed the predetermined threshold, the flow returns to step S2.

In step S4, the validity determination unit 13 determines whether the sensor 20 operating with accuracy of "high" is present within a predetermined distance from the first sensor. When it is determined that the sensor 20 operating with accuracy of "high" is present, the flow proceeds to step S5. On the other hand, when it is determined that the sensor 20 operating with accuracy of "high" is not present, the flow proceeds to step S6.

In step S5, the validity determination unit 13 determines the validity of the first measurement value on the basis of the first evaluation value (see Expression (1)) calculated on the basis of the measurement values acquired from the other sensors 20. The first evaluation value is calculated by statistically summing the measurement values of the other sensors 20 weighted on the basis of the accuracy of the sensors 20.

In step S6, the validity determination unit 13 determines the validity of the first measurement value on the basis of the second evaluation value (see Expression (2)) calculated on the basis of the measurement values acquired from the other sensors 20. The second evaluation value is calculated by statistically summing the measurement values of the other sensors 20 weighted on the basis of at least one of the time difference between the time point at which the first measurement value exceeding the predetermined threshold was measured and the time point at which the measurement values of the other sensors 20 were measured and the distance between the first sensor and the other sensors 20.

The validity determination unit 13 may determine the validity of the first measurement value on the basis of any one of the first evaluation value illustrated in step S5 and the second evaluation value illustrated in step S6 without performing the determination process illustrated in step S4.

In step S7, the validity determination unit 13 determines whether the first measurement value is valid. When it is determined that the first measurement value is valid, the flow proceeds to step S8. On the other hand, when it is determined that the first measurement value is not valid, the flow returns to step S2.

In step S8, the measurement level determination unit 14 determines that the measurement level of the first sensor is to be raised. In the present embodiment, for example, the measurement level determination unit 14 may determine that the measurement level is to be raised to "4" corresponding to the highest degree of detail of observation. Moreover, the measurement level determination unit 14 may determine that the measurement levels of at least one or more sensors among the sensors provided outside the range of a predetermined distance from the first sensor are to be raised. The instruction unit 15 transmits instruction information for changing the measurement level of the first sensor to the first sensor on the basis of the determination result obtained by the measurement level determination unit 14. Furthermore, the instruction unit 15 may transmit instruction information to another sensor other than the first sensor among the plurality of sensors 20 on the basis of the determination result obtained by the measurement level determination unit 14.

In step S9, the measurement value determination unit 12 determines whether the first measurement value of the first sensor is equal to or smaller than the predetermined threshold for a predetermined period or longer. When it is determined that the first measurement value is equal to or smaller than the predetermined threshold for a predetermined period or longer, the flow proceeds to step S10. On the other hand, when it is determined that the first measurement value is not equal to or smaller than the predetermined threshold for the predetermined period or longer, the flow proceeds to step S11.

In step S10, the measurement level determination unit 14 determines that the measurement levels of the first sensor and the other sensor of which the measurement levels were raised in step S8 are to be lowered. For example, the measurement level determination unit 14 may determine that the measurement level of the sensors are to be lowered so as to correspond to the number of sensors for each measurement level defined in the default information. The instruction unit 15 transmits instruction information for lowering the measurement levels of the respective sensors to the respective sensors on the basis of the determination result obtained by the measurement level determination unit 14. After that, the flow returns to step S2.

On the other hand, in step S11, the acquisition unit 11 acquires the measurement values measured at the measurement levels set to the respective sensors. After that, the flow returns to step S9.

Figure 10:
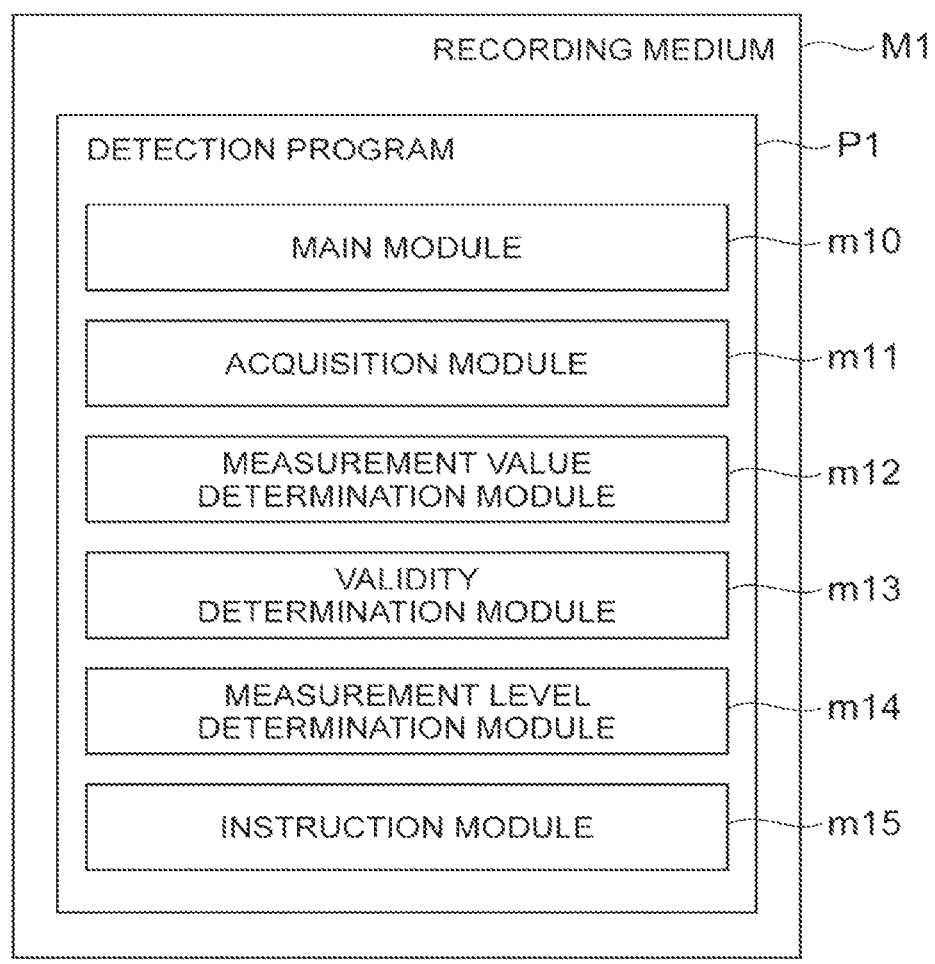
FIG. 10 is a diagram illustrating a configuration of a detection program.

Next, a detection program for causing a computer to function as the terminal 10 of the present embodiment will be described. FIG. 10 is a diagram illustrating a configuration of the detection program P1.

The detection program P1 includes a main module m10 that integrally controls the detection process of the terminal 10, an acquisition module m11, a measurement value determination module m12, a validity determination module m13, a measurement level determination module m14, and an instruction module m15. The respective functions of the acquisition unit 11, the measurement value determination unit 12, the validity determination unit 13, the measurement level determination unit 14, and the instruction unit 15 of the terminal 10 are realized by the respective modules m11 to m15. The detection program P1 may be transmitted via a transmission medium such as a communication line and may be stored in a recording medium M1 as illustrated in FIG. 10.

In the terminal 10, the detection method, and the detection program P1 according to the above-described embodiment, a measurement value indicating that a measurement target is to be observed in more detail is set in advance as a predetermined threshold, and the validity of a first measurement value is determined on the basis of a measurement value of another sensor other than a first sensor when a first measurement value from the first sensor among a plurality of sensors 20 exceeds the predetermined threshold. Therefore, it is appropriately determined whether sensing is to be performed by raising a measurement level. Since the power consumption increases as the measurement level of a sensor increases, the measurement level of the first sensor is raised only when it is determined that sensing is to be performed by raising the measurement level. Therefore, the measurement level is not raised when it is not necessary to perform sensing in detail, and power consumption can be suppressed.

In the detection apparatus according to another embodiment, the validity determination unit may determine the validity of the first measurement value on the basis of a first evaluation value calculated on the basis of the measurement values acquired from the other sensors, and the first evaluation value may be calculated by statistically summing the measurement values of the other sensors weighted on the basis of accuracy of the sensors.

According to this embodiment, since the first evaluation value calculated by statistically summing the measurement values of the other sensors weighted on the basis of the accuracy of the respective sensors is used for determination of the validity of the first measurement value, the validity of the first measurement value is determined appropriately and the measurement target is sensed with an appropriate degree of detail.

In the detection apparatus according to another embodiment, the validity determination unit may determine the validity of the first measurement value on the basis of a second evaluation value calculated on the basis of measurement values acquired from other sensors, and the second evaluation value may be calculated by statistically summing the measurement values of the other sensors weighted on the basis of at least one of a time difference between a time point at which the first measurement value exceeding the predetermined threshold was measured and a time point at which the measurement values of other sensors were measured and a distance between the first sensor and the other sensors.

According to this embodiment, since the second evaluation value is calculated by statistically summing the measurement values of the other sensors weighted on the basis of at least one of the time difference from the time point at which the first measurement value was measured and the distance from the first sensor, the second evaluation value is a value calculated by taking a spatial correlation between sensors and a temporal correlation between measurement values into consideration. Moreover, since the second evaluation value calculated in this manner is used for determining the validity of the first measurement value, the validity of the first measurement value is determined appropriately and the measurement target is sensed with an appropriate degree of detail.

In the detection apparatus according to another embodiment, the validity determination unit may determine the validity of the first measurement value on the basis of the first evaluation value calculated on the basis of the measurement values acquired from other sensors when a sensor operating with a predetermined degree or more of accuracy is present within a predetermined distance from the first sensor, and may determine the validity of the first measurement value on the basis of the second evaluation value calculated on the basis of the measurement values acquired from other sensors when the sensor operating with a predetermined degree or more of accuracy is not present within a predetermined distance from the first sensor, the first evaluation value may be calculated by statistically summing the measurement values of the other sensors weighted on the basis of the accuracy of the other sensors, and the second evaluation value may be calculated by statistically summing the measurement values of the other sensors weighted on the basis of at least one of a time difference between a time point at which the first measurement value exceeds a predetermined threshold and a time point at which the measurement values of the other sensors were measured and the distance between the first sensor and the other sensors.

According to this embodiment, since the first evaluation value is used for determining the validity when a sensor operating with a predetermined degree or more of accuracy is present within the predetermined distance from the first sensor, the validity of the first measurement value is determined by taking the accuracy of the other sensors present around the first sensor into consideration. Moreover, since the second evaluation value is used for determination of the validity when a sensor operating with a predetermined degree or more of accuracy is not present within a predetermined distance from the first sensor, the validity of the first measurement value is determined by taking a spatial correlation between sensors and a temporal correlation between measurement values into consideration. Therefore, the validity of the first measurement value is determined appropriately depending on the presence of a sensor operating with a predetermined degree or higher of accuracy, positioned within a predetermined distance from the first sensor.

In the detection apparatus according to another embodiment, the measurement level determination unit may determine that the measurement levels of at least one or more sensors among the sensors provided outside the range of the predetermined distance from the first sensor are to be raised when the validity determination unit determines that the first measurement value is valid.

According to this embodiment, since the measurement level of a sensor present outside the range of a predetermined distance from the first sensor is raised when it is determined that the first measurement value is valid, detailed sensing is performed when it is necessary to observe the measurement target in more detail.

In the detection apparatus according to another embodiment, when the measurement value determination unit determines that the first measurement value is equal to or smaller than a predetermined threshold for a predetermined period or longer, the measurement level determination unit may determine that the measurement levels of at least one or more sensors among the sensors of which the measurement levels are determined to be raised are to be lowered on the basis of a fact that the first measurement value exceeds the predetermined threshold.

According to this embodiment, when a state in which the first measurement value is equal to or smaller than the predetermined threshold is maintained for a predetermined period or longer, it is less necessary to observe the measurement target by raising the degree of detail. Since the measurement level of the sensor of which the measurement level is raised is lowered on the basis of a fact that the first measurement value exceeds the predetermined threshold, the power consumption is suppressed.

In the detection apparatus according to another embodiment, the measurement level determination unit may estimate the power consumption of the respective sensors on the basis of an operation time at each measurement level in a predetermined period before it was determined by the measurement value determination unit that the first measurement value is equal to or smaller than the predetermined threshold for a predetermined period or longer and may determine the measurement level of each sensor so that the larger the estimated power consumption of the sensor, the lower the measurement level with which the sensor operates.

According to this embodiment, since the power consumption of each sensor in adjacent predetermined periods is estimated, and the measurement level is set such that the larger the power consumption of a sensor, the lower becomes the measurement level on the basis of the estimated power consumption, the power consumption of the respective sensors is equalized.

In the detection apparatus according to another embodiment, the detection apparatus may be able to refer to default information that defines a standard number of sensors for each measurement level in advance for the plurality of sensors that senses the measurement target, and the measurement level determination unit may determine that the measurement level of a sensor of which the measurement level is determined to be raised is to be lowered on the basis of a fact that the first measurement value exceeds the predetermined threshold corresponding to the default information.

According to this embodiment, since the default information that defines the number of sensors for each measurement level is set as an observation state during a normal state and the measurement level of the sensor of which the measurement level is determined to be raised is to be lowered on the basis of a fact that the first measurement value exceeds the predetermined threshold corresponding to the default information, it is possible to restore the measurement level to an appropriate observation state during a normal state.

In the detection apparatus according to another embodiment, the measurement level may be defined by at least the sensing accuracy for the measurement target.

According to the above-described embodiment, a measurement level is defined appropriately.

The respective aspects and embodiments described in the present specification may be applied to Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide-Band (UWB), Bluetooth (registered trademark), a system which uses other appropriate systems, and/or a next-generation system which is extended on the basis of these systems.

The orders in the processing procedures, the sequences, the flowcharts, and the like described in the respective aspects and embodiments described in the present specification may be switched unless contradiction occurs. For example, in the method described in the present specification, although various steps are illustrated in an exemplary order, the steps are not limited to the illustrated specific order.

Input and output information and the like may be stored in a specific location (for example, a memory) and may be managed by a management table. The input and output information and the like may be overwritten, updated, or rewritten. The output information and the like may be erased. The input information and the like may be transmitted to other apparatuses.

Determination may be made by a value (0 or 1) represented by one bit, may be made by a Boolean value (true or false), and may be made by comparison of numerical values (comparison with a predetermined value, for example).

The respective aspects and embodiments described in the present specification may be used solely, may be used in combination, and may be switched and used according to execution. Moreover, the notification (notification of "X," for example) of predetermined information is not limited to being performed explicitly but may be performed implicitly (for example, without performing the notification of the predetermined information).

While the present disclosure has been described above in detail using the embodiment, it is obvious to those skilled in the art that the pd is not limited only to the embodiment described in the present disclosure. The pd can also be embodied in other modified and altered forms without departing from the gist and scope of the pd as defined in the appended claims. It is therefore to be understood that the disclosure of the present disclosure is intended for the purpose of description and exemplification but is not intended to limit the scope of the present disclosure.

The software should be widely interpreted to mean an instruction, an instruction set, a code, a code segment, a program code, a program, a subprogram, a software module, an application, a software application, a software package, a routine, a subroutine, an object, an executable file, an execution thread, a procedure, a function, and the like, regardless of whether the software is referred to as software, firmware, middleware, microcode, hardware description language or other names.

Furthermore, software, instructions, and the like, may be transmitted and received via a transmission medium. For example, when the software is transmitted from a website, server, or another remote source using wired technology such as coaxial cable, fiber optic cable, twisted pair and digital subscriber line (DSL) and/or wireless technology such as infrared rays, radio, and microwave, these wired and/or wireless technologies are included within the definition of the transmission medium.

Information, signals, and the like described in the present disclosure may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

The terms described in the present disclosure and/or the terms necessary for understanding of the present specification may be replaced with terms having the same or similar meaning.

The terms "system" and "network" as used in the present specification are used interchangeably.

Furthermore, the information, parameters, and the like described in the present specification may be represented by absolute values, may be represented as relative values from predetermined values, or may be represented by any other corresponding information.

The terms "determine (determining)" and "decide (determining)" used in the present disclosure may include various types of operations. For example, "determining" and "deciding" may include considering that a result of judging, calculating, computing, processing, deriving, investigating, looking up (search or inquiry) (for example, search in a table, a database, or another data structure), or ascertaining is "determined" or "decided." Furthermore, "determining" and "deciding" may include, for example, considering that a result of receiving (for example, reception of information), transmitting (for example, transmission of information), inputting, outputting, or accessing (for example, accessing data in memory) is "determined" or "decided." Furthermore, "determining" and "deciding" may include considering that a result of resolving, selecting, choosing, establishing, or comparing is "determined" or "decided." That is, "determining" and "deciding" may include considering that a certain operation is "determined" or "decided." Moreover, "determining (deciding)" may be replaced with "assuming," "expecting," "considering," and the like.

The expression "on the basis of" used in the present disclosure does not mean "on the basis of only" unless particularly stated otherwise. In other words, the expression "on the basis of" means both "on the basis of only" and "on the basis of at least."

Any reference to elements using names, such as "first" and "second," as used in the present specification does not generally limit the amount or order of those elements. These names can be used in the present specification as a convenient way to distinguish between two or more elements. Therefore, the reference to the first and second elements does not imply that only two elements can be adopted, or that the first element must precede the second element in some way.

As long as "include," "including," and variations thereof are used in the present specification or the claims, these terms are intended to be inclusive in a manner similar to the expression "comprising." Furthermore, the expression "or" used in the specification or claims is not intended to mean an exclusive logical sum.

In the present specification, an apparatus may include plural apparatuses unless it is obvious that only one apparatus is present due to the context or the technique.

In the entire present disclosure, an element may be provided plurally unless it is clear from the context that the element is provided singly.

REFERENCE SIGNS LIST

M1: Recording medium
P1: Detection information m10: Main module
m11: Acquisition module
m12: Measurement value determination module
m13: Validity determination module
m14: Measurement level determination module
m15: Instruction module
1: Detection system
10: Terminal
11: Acquisition unit
12: Measurement value determination unit
13: Validity determination unit
14: Measurement level determination unit
15: Instruction unit
16: Default information storage unit
20: Sensor
21: Detection unit
22: Transmitting unit
23: Receiving unit
24: Operation control unit

The invention claimed is:

1. A system comprising:
a plurality of sensors that sense a predetermined measurement target with measurement levels set therein; and
a detection apparatus configured to acquire measurement values from the plurality of sensors and control the sensors, the measurement level being a degree of sensing detail of the measurement target, the detection apparatus comprising circuitry configured to:
acquire the measurement values from each of the plurality of sensors;
determine whether a first measurement value acquired from a first sensor among the plurality of sensors exceeds a predetermined threshold;
determine validity of the first measurement value on the basis of measurement values acquired from one or more sensors other than the first sensor among the plurality of sensors when the circuitry determines that the first measurement value exceeds the predetermined threshold;
determine that the measurement level of the first sensor is to be raised when the circuitry determines that the first measurement value is valid; and
transmit instruction information for changing the measurement level of the first sensor on the basis of a determination result obtained by the circuitry,
wherein the first sensor is configured to change the measurement level in response to the transmitted instruction information, and
the measurement level is defined by at least sensing accuracy for the measurement target, the sensing accuracy corresponding to a sensing frequency that is set for each of the sensors,
wherein
the circuitry determines the validity of the first measurement value on the basis of a first evaluation value calculated on the basis of the measurement values acquired from the one or more sensors other than the first sensor,
the first evaluation value is calculated by statistically summing the measurement values of the one or more sensors other than the first sensor weighted on the basis of accuracy of each sensor,
the circuitry determines the validity of the first measurement value on the basis of a second evaluation value calculated on the basis of the measurement values acquired from the one or more sensors other than the first sensor, and the second evaluation value is calculated by statistically summing the measurement values of the one or more sensors other than the first sensor weighted on the basis of at least one of a time difference between a time point at which the first measurement value exceeding the predetermined threshold was measured and a time point at which the measurement values of the one or more sensors other than the first sensor were measured and distances between the first sensor and the one or more sensors other than the first sensor.

2. The system according to claim 1, wherein
the circuitry determines that the measurement levels of at least one or more sensors among sensors provided outside a range of a predetermined distance from the first sensor are to be raised when the circuitry determines that the first measurement value is valid.

3. The system according to claim 1, wherein
when the circuitry determines that the first measurement value is equal to or smaller than the predetermined threshold for a predetermined period or longer, and
the circuitry determines that the measurement levels of at least one or more sensors among sensors of which the measurement levels are determined to be raised are to be lowered on the basis of a fact that the first measurement value exceeds the predetermined threshold.

4. The system according to claim 3, wherein
the circuitry estimates power consumption of respective sensors on the basis of an operation time at each measurement level in a predetermined period before the circuitry determines that the first measurement value is equal to or smaller than the predetermined threshold for a predetermined period or longer and determines the measurement levels of the sensors so that a sensor with larger estimated power consumption operates at a lower measurement level.

5. The system according to claim 3, wherein
the detection apparatus is able to refer to default information that defines a standard number of sensors for each measurement level in advance for the plurality of sensors that sense the measurement target, and
the circuitry determines that the measurement level of a sensor of which the measurement level is determined to be raised is to be lowered on the basis of a fact that the first measurement value exceeds the predetermined threshold corresponding to the default information.

6. A system comprising:
a plurality of sensors that sense a predetermined measurement target with measurement levels set therein; and
a detection apparatus configured to acquire measurement values from the plurality of sensors and control the sensors, the measurement level being a degree of sensing detail of the measurement target, the detection apparatus comprising circuitry configured to:
acquire the measurement values from each of the plurality of sensors;
determine whether a first measurement value acquired from a first sensor among the plurality of sensors exceeds a predetermined threshold;
determine validity of the first measurement value on the basis of measurement values acquired from one or more sensors other than the first sensor among the plurality of sensors when the circuitry determines that the first measurement value exceeds the predetermined threshold;
determine that the measurement level of the first sensor is to be raised when the circuitry determines that the first measurement value is valid; and transmit instruction information for changing the measurement level of the first sensor on the basis of a determination result obtained by the circuitry, wherein the first sensor is configured to change the measurement level in response to the transmitted instruction information, and the measurement level is defined by at least sensing accuracy for the measurement target, the sensing accuracy corresponding to a sensing frequency that is set for each of the sensors, wherein the circuitry determines the validity of the first measurement value on the basis of a first evaluation value calculated on the basis of the measurement values acquired from the one or more sensors other than the first sensor when a sensor operating with a predetermined degree or more of accuracy is present within a predetermined distance from the first sensor, the circuitry determines the validity of the first measurement value on the basis of a second evaluation value calculated on the basis of the measurement values acquired from the one or more sensors other than the first sensor when a sensor operating with the predetermined degree or more of accuracy is not present within the predetermined distance from the first sensor, the first evaluation value is calculated by statistically summing the measurement values of the one or more sensors other than the first sensor weighted on the basis of the accuracy of the one or more sensors other than the first sensor, and the second evaluation value is calculated by statistically summing the measurement values of the one or more sensors other than the first sensor weighted on the basis of at least one of a time difference between a time point at which the first measurement value exceeds the predetermined threshold and a time point at which the measurement values of the one or more sensors other than the first sensor were measured and distances between the first sensor and the one or more sensors other than the first sensor.

7. The system according to claim 6, wherein
the circuitry determines that the measurement levels of at least one or more sensors among sensors provided outside a range of a predetermined distance from the first sensor are to be raised when the circuitry determines that the first measurement value is valid.

8. The system according to claim 6, wherein
when the circuitry determines that the first measurement value is equal to or smaller than the predetermined threshold for a predetermined period or longer, and the circuitry determines that the measurement levels of at least one or more sensors among sensors of which the measurement levels are determined to be raised are to be lowered on the basis of a fact that the first measurement value exceeds the predetermined threshold.

9. The system according to claim 8, wherein
the circuitry estimates power consumption of respective sensors on the basis of an operation time at each measurement level in a predetermined period before the circuitry determines that the first measurement value is equal to or smaller than the predetermined threshold for a predetermined period or longer and determines the measurement levels of the sensors so that a sensor with larger estimated power consumption operates at a lower measurement level.

10. The system according to claim 8, wherein
the detection apparatus is able to refer to default information that defines a standard number of sensors for each measurement level in advance for the plurality of sensors that sense the measurement target, and the circuitry determines that the measurement level of a sensor of which the measurement level is determined to be raised is to be lowered on the basis of a fact that the first measurement value exceeds the predetermined threshold corresponding to the default information.

11. A method implemented by a system that includes a plurality of sensors that sense a predetermined measurement target with measurement levels set therein, and a detection apparatus configured to acquire measurement values from the plurality of sensors and control the sensors, the measurement level being a degree of sensing detail of the measurement target, the method comprising:

acquiring, by circuitry of the detection apparatus, the measurement values from each of the plurality of sensors;

determining, by the circuitry, whether a first measurement value acquired from a first sensor among the plurality of sensors exceeds a predetermined threshold value;

determining, by the circuitry, validity of the first measurement value on the basis of measurement values acquired from one or more sensors other than the first sensor among the plurality of sensors in response to determining by the circuitry that the first measurement value exceeds the predetermined threshold;

determining, by the circuitry, that the measurement level of the first sensor is to be raised in response to determining by the circuitry that the first measurement value is valid; and transmitting, by the circuitry, instruction information for changing the measurement level of the first sensor on the basis of a determination result obtained by the circuitry, wherein the first sensor is configured to change the measurement level in response to the transmitted instruction information, and the measurement level is defined by at least sensing accuracy for the measurement target, the sensing accuracy corresponding to a sensing frequency that is set for each of the sensors, wherein
the circuitry performs determining the validity of the first measurement value on the basis of a first evaluation value calculated on the basis of the measurement values acquired from the one or more sensors other than the first sensor, the first evaluation value is calculated by statistically summing the measurement values of the one or more sensors other than the first sensor weighted on the basis of accuracy of each sensor, the circuitry performs determining the validity of the first measurement value on the basis of a second evaluation value calculated on the basis of the measurement values acquired from the one or more sensors other than the first sensor, and the second evaluation value is calculated by statistically summing the measurement values of the one or more sensors other than the first sensor weighted on the basis of at least one of a time difference between a time point at which the first measurement value exceeding the predetermined threshold was measured and a time point at which the measurement values of the one or more sensors other than the first sensor were measured and distances between the first sensor and the one or more sensors other than the first sensor.

* * * * *